(12) United States Patent
Buonocunto et al.

(10) Patent No.: US 11,784,884 B2
(45) Date of Patent: Oct. 10, 2023

(54) CODE ACTIVATION MANAGEMENT METHOD FOR NETWORK SLICING SOLUTIONS, AND CORRESPONDING ENTITY, SERVER AND COMPUTER PROGRAM

(71) Applicant: Telefonaktiebolaget LM Ericsson (publ), Stockholm (SE)

(72) Inventors: Antonio Buonocunto, Angri (IT); Francesca Marfia, Pagani (IT); Francesco Conte, Salerno (IT); Andrea Formica, Nocera Inferiore (IT); Fabio Ronca, Casavatore (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/774,223

(22) PCT Filed: Nov. 8, 2019

(86) PCT No.: PCT/EP2019/080711
§ 371 (c)(1),
(2) Date: May 4, 2022

(87) PCT Pub. No.: WO2021/089172
PCT Pub. Date: May 14, 2021

(65) Prior Publication Data
US 2022/0407778 A1    Dec. 22, 2022

(51) Int. Cl.
*H04L 41/0895* (2022.01)
*H04L 41/0806* (2022.01)

(52) U.S. Cl.
CPC ...... *H04L 41/0895* (2022.05); *H04L 41/0806* (2013.01)

(58) Field of Classification Search
CPC ............ H04L 41/0895; H04L 41/0806; H04L 41/0803; H04L 41/40; H04L 41/5041
See application file for complete search history.

(56) References Cited

U.S. PATENT DOCUMENTS

2016/0353465 A1* 12/2016 Vrzic .................. H04W 72/29
2017/0171398 A1*  6/2017 Vagelos ............. H04M 15/844
(Continued)

FOREIGN PATENT DOCUMENTS

KR     20170100292 A     9/2017

OTHER PUBLICATIONS

Unknown, Author, "ETSI GR NFV-EVE 010 V3.1 1", Network Functions Virtualisation (NFV) Release 3; Licensing Management; Report on License Management for NFV, Dec. 2017, pp. 1-31.
(Continued)

*Primary Examiner* — Michael Won
(74) *Attorney, Agent, or Firm* — Murphy, Bilak & Homiller, PLLC

(57) ABSTRACT

Methods and apparatuses in the field of network slice management are disclosed. A method of managing, by means of an activation code management server (100), a plurality of activation codes (511 562) in a network includes steps of: providing (S31), for each of a plurality of network slices, a network slice identifier (570) in correspondence with a network slice; providing (S32) at least one VNF-product identifier (580), each VNF-product identifier (580) being in correspondence with a VNF; providing (S33) a plurality of activation code indicators (510, 520, 530, 540, 550, 560), each activation code indicator (510, 520, 530, 540, 550, 560 being indicative of one or more of the plurality of activation codes (511 562); and associating each of the plurality of activation code indicators (510, 520, 530, 540,
(Continued)

550, 560) with a corresponding network slice identifier (570) and a corresponding VNF-product identifier (580).

13 Claims, 5 Drawing Sheets

(56) References Cited

U.S. PATENT DOCUMENTS

| | | | | |
|---|---|---|---|---|
| 2018/0132117 A1* | 5/2018 | Senarath | ............... | H04W 24/02 |
| 2018/0242198 A1* | 8/2018 | Choi | ................. | H04L 67/51 |
| 2019/0260690 A1* | 8/2019 | Sun | ...................... | H04L 47/2425 |
| 2019/0312782 A1* | 10/2019 | Vaishnavi | ............. | H04W 16/00 |
| 2020/0228405 A1* | 7/2020 | Fang | .................. | H04L 41/0893 |
| 2020/0344126 A1* | 10/2020 | Fang | .................. | H04L 41/0893 |
| 2021/0044482 A1* | 2/2021 | Katsalis | ............. | H04L 41/5009 |
| 2021/0099335 A1* | 4/2021 | Li | ....................... | H04L 41/0618 |
| 2021/0263779 A1* | 8/2021 | Haghighat | ............ | G06F 9/5061 |
| 2021/0329544 A1* | 10/2021 | Bertin | ................. | H04W 12/088 |
| 2022/0322211 A1* | 10/2022 | Maria | .................. | H04W 48/16 |

OTHER PUBLICATIONS

Unknown, Author, "ETSI GR NFV-EVE 012 V3.1.1", Network Functions Virtualisation (NFV) Release 3; Evolution and Ecosystem; Report on Network Slicing Support with ETSI NFV Architecture Framework, Dec. 2017, pp. 1-35.

* cited by examiner

CODE ACTIVATION MANAGEMENT METHOD FOR NETWORK SLICING SOLUTIONS, AND CORRESPONDING ENTITY, SERVER AND COMPUTER PROGRAM

TECHNICAL FIELD

The present invention generally relates to the field of network slice management. In particular, the present invention is directed to apparatuses and methods for managing a plurality of activation codes referring to at least one virtualized network function, VNF, in a network, the network including a plurality of network slices.

BACKGROUND

Conventional networks are characterized by a monolithic architectural approach which have little or no modularity or flexibility. Such conventional networks are no longer able to address the new requirements in terms of latency, scalability, availability and reliability imposed by new technologies, such as the internet of things (IoT) and new use cases of 5G cellular network technology (including enhanced Mobile Broadband (eMBB), Ultra Reliable Low Latency Communications (URLLC) and massive Machine Type Communications (mMTC)).

In recent years, network softwarization technologies, such as, for example, Network Function Virtualization (NFV) and Software Defined Networking (SDN) have been developed that allow the needs of new technologies requiring improved architecture, such as 5G systems, to be met. Such network softwarization technologies separate network functions from the hardware they run on by using virtual hardware abstraction, thereby transforming networks and providing programmability, flexibility, and modularity.

By means of network softwarization, it is possible to provide multiple logical (that is, virtual) networks on top of a common network (i.e. on top of the same physical network infrastructure). Each virtual network may be tailored for a specific use case and each virtual network is isolated and requires independent control and management. Such virtual networks are commonly referred to as network slices.

Each network slice may be formed of one or more Virtualised Network Functions (VNF) (which can be seen as a type of virtual application, e.g. as a piece of software which can be loaded into a Virtual Machine) connected by virtual links. Each VNF represents a remodeled physical device or other network function, such as a firewall, implemented as a software package that can be deployed on a Network Function Virtualisation Infrastructure (NFVI).

A VNF is typically developed by a VNF provider, who provides a VNF software package and associated licenses for use to a network service provider. The network service provider or network operator makes use of an electronics communications network or part thereof to provide a service or services, such as a network service (NS), to end users.

Due to the increasing use of automation in deploying network slices and VNFs, licenses for use of a VNF function extend beyond a traditional contract or agreement and instead serve as keys for use in automatically monitoring, controlling, and enforcing how a VNF is used.

SUMMARY OF THE INVENTION

Technical Problem

Conventionally, each VNF provider uses its own license management mechanism, making service provisioning and license renewal operations complex, not automatable, error prone and time consuming especially for the network service provider. The issue is addressed by ETSI Industry Specification Group (ISG) Network Functions Virtualization (NFV) in ETSI GR NFV-EVE 010 V3.1.1 (https://www.etsi.org/deliver/etsigr/NFV-EVE/001_099/010/03.01.01_60/gr_NFV-EVE010v030101p.pdf), by defining a set of use cases for license instantiation, termination, enabling, disabling, sharing and revisioning.

However, as of yet, no solutions have been envisaged for license management in cases where network slicing is applied such that the network of a given network service provider may include multiple network slices. The lack of solutions from standardization or guidelines for license management in cases where network slicing is applied forces network service providers to use license management configurations that are not efficient and suitable for automatically monitoring, controlling, and enforcing how a VNF is used, particularly with regard to new coming use cases foreseen by 5G systems.

A first conventional license management configuration comprises providing a single license server for each network slice. This model is not flexible because it requires providing a license gateway in the network to manage all license severs. Therefore, this configuration significantly degrades the advantages of improved programmability, flexibility, and modularity for which network softwarization technologies are used.

Accordingly, a second frequently-used conventional license management configuration comprises providing a single license server serving all network slices. In order to overcome this limitation, network service providers using this configuration are required to collapse the capability of all network slices into a single license that is shared across all network slices such that it is not possible to differentiate license properties for each slice. Consequently, this configuration also significantly reduces the possibility of obtaining the desired levels of automation and flexibility. In general, the second conventional license management configuration is widely established as it is considered easy to implement.

That is, the present inventors have recognised that conventional license management configurations do not allow a network service provider to dimension, order and utilize a license within the scope of a single network slice. In particular, the conventional license management configurations described above suffer from the following issues:
  Insufficient granularity for license handling. (i.e. network service provider are forced to operate at network level instead of slice level by using a license per VNF for all slices).
  Inefficient monitoring, controlling, and enforcing how a VNF.
  An inability to facilitate a multi-operator scenario as the above described conventional license management configurations provide a single license server per network service provider.

Furthermore, in order to allow parallel network slices to operate on a common shared underlying physical network infrastructure, it is critical to ensure the isolation of respective network slices from one another. In particular, in addition to independently managing each network slice, it is vital that poor performance levels, attacks or faults occurring in one network slice do not have an impact on other network slices. However, where a single activation code management server serves all network slices, any issue in the activation code management will propagate between network slices as each VNF may be instantiated multiple times on multiple network slices. By way of example, an issue with one VNF activation code might result in failure of part of or an entire 5G network as multiple instances of a VNF may be involved in multiple network slice instances.

It is likely that new and emerging technologies, such as 5G systems, will support a huge number of network slice instances to meet the variety of use cases and diversity of associated requirements. For example, eMBB may require high data rates across a wide coverage area and URLLC may be required to meet strict requirements on latency and reliability. Hence, it is critical to monitor, control, and enforce how VNFs are used in network slicing in a way that both guarantees the isolation of each network slice and provides the advantages of improved programmability, flexibility, and modularity for which network softwarization technologies are used.

Summary of the Solution

The present invention is intended to address one or more of the above technical problems.

In particular, in view of the limitations discussed above, the present inventors have devised, in accordance with a first example aspect herein, a computer-implemented method of managing, by means of an activation code management server, a plurality of activation codes referring to at least one virtualized network function, VNF, in a network, the network including a plurality of network slices. The method including steps of: providing, for each of the plurality of network slices, a network slice identifier in correspondence with a network slice; providing at least one VNF-product identifier, each VNF-product identifier being in correspondence with a VNF; providing a plurality of activation code indicators, each activation code indicator being indicative of one or more of the plurality of activation codes; and associating, at the server, each of the plurality of activation code indicators with a corresponding network slice identifier and a corresponding VNF-product identifier.

The present inventors have further devised, in accordance with a second example aspect herein, a computer-implemented method of managing, by means of a network entity of a network including a plurality of network slices, at least one virtualized network function, VNF. The method includes steps of transmitting, to an activation code management server configured to manage a plurality of activation codes, a request to enable a function of a first VNF among the at least one VNF in a first network slice among the plurality of network slices, the request comprising information indicative of the first VNF and the first network slice; and receiving, from the server, an activation code indicator associated with a VNF-product identifier corresponding to the first VNF and a network slice identifier corresponding to the first network slice, the activation code indicator being indicative of one or more of the plurality of activation codes.

The present inventors have further devised, in accordance with a third example aspect herein, a computer program which, when executed by a computer, causes the computer to perform the method according to the first to second example aspect herein.

The present inventors have further devised, in accordance with a fourth example aspect herein, a non-transitory computer-readable storage medium storing a computer program in accordance with the third aspect.

The present inventors have further devised, in accordance with a fifth example aspect herein, a signal carrying a computer program in accordance with the third aspect.

The present inventors have further devised, in accordance with the sixth example aspect herein, an activation code management server configured to manage a plurality of activation codes referring to at least one virtualized network function, VNF, in a network, the network including a plurality of network slices. The activation code management server comprises a storage module and a processing module. The processing module is configured to provide, for each of the plurality of network slices, a network slice identifier in correspondence with a network slice; provide at least one VNF-product identifiers, each VNF-product identifier being in correspondence with a VNF; provide a plurality of activation code indicators, each activation code indicator being indicative of one or more of the plurality of activation codes; and associate, at the server, each of the plurality of activation code indicators with a corresponding network slice identifier and a corresponding VNF-product identifier.

The present inventors have further devised, in accordance with the seventh example aspect herein, a network entity configured to manage at least one virtualized network function, VNF, of a network including a plurality of network slices. The network entity comprises a storage module and a processing module. The processing module is configured to transmit, to an activation code management server configured to manage a plurality of activation codes, a request to enable a function of a first VNF among the at least one VNF in a first network slice among the plurality of network slices, the request comprising information indicative of the first VNF and the first network slice; and receive, from the server, an activation code indicator that is associated with a VNF-product identifier corresponding to the first VNF and a network slice identifier corresponding to the first network slice, the activation code indicator being indicative of one or more of the plurality of activation codes.

Accordingly, as the activation codes indicated by each activation code indicator are associated with a particular network slice indicated by a corresponding network slice identifier, it is possible to monitor, control, and enforce how VNFs are used in network slicing in a way that both guarantees the isolation of each network slice and provides the advantages of improved programmability, flexibility, and modularity.

BRIEF DESCRIPTION OF THE DRAWINGS

Embodiments of the invention will now be explained in detail, by way of non-limiting example only, with reference to the accompanying figures, described below. Like reference numerals appearing in different ones of the figures can denote identical or functionally similar elements, unless indicated otherwise.

DETAILED DESCRIPTION

Figure 2:
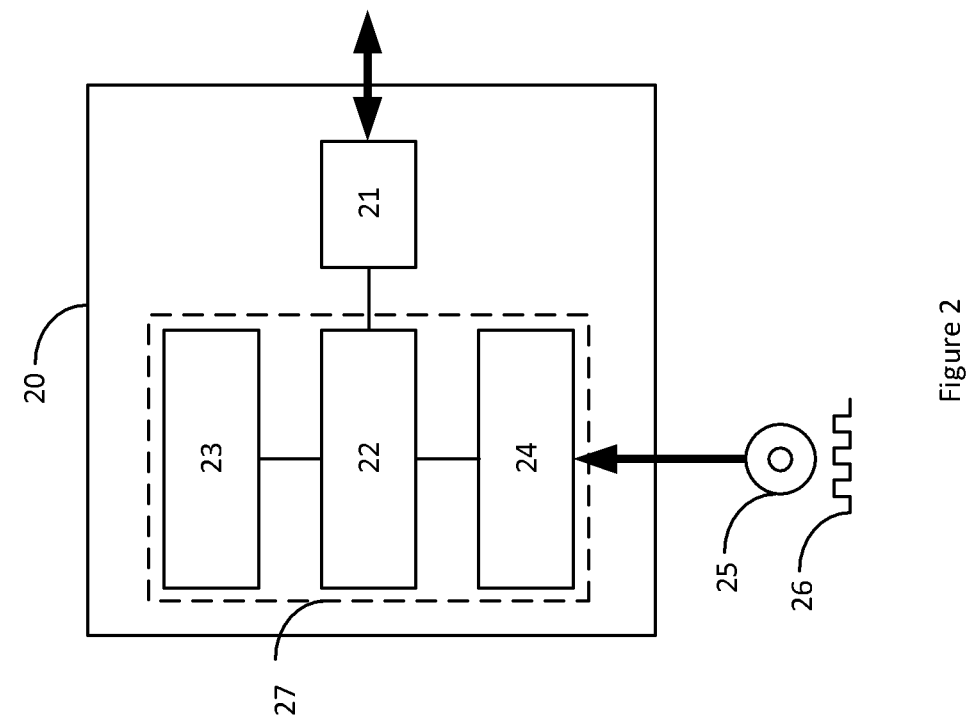
FIG. 2 is a block diagram illustrating an example signal processing hardware configuration of the apparatus of FIG. 1A or FIG. 1B, according to an example aspect herein.

Example embodiments of the present invention will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

In order to control deployment, management, and orchestration of network services, a network of the network services provider may include a Network Functions Virtualisation Management and Orchestration (NFV MANO). The NFV MANO may in turn comprise a plurality of functional blocks or modules including a Network Functions Virtualisation Orchestrator (NFVO) and a VNF manager (VNFM).

The NFVO is a functional block that manages network service (NS) lifecycle and coordinates the management of NS lifecycle, VNF lifecycle (supported by the VNFM) and Network Functions Virtualisation Infrastructure (NFVI) resources (supported by the virtualised infrastructure manager, VIM) to ensure an optimized allocation of the necessary resources and connectivity. The VNFM is a functional block that is responsible for the lifecycle management of VNFs, including instantiation, configuration and termination of VNF instances. An element manager (EM) works together with the VNFM to configure a VNF to provide a specific network function.

The network may further comprise an operations support system/business support system (OSS/BSS) comprising the network service providers proprietary systems and management applications used to support a range of telecommunication services.

The network may further comprise a plurality of network slices, and each network slice may be formed of one or more VNFs connected by virtual links.

Each VNF represents a remodeled physical device, appliance, node (e.g. a network node) or other network function, such as a firewall, implemented as a software package that can be deployed on a Network Function Virtualisation Infrastructure (NFVI). By way of non-limiting example, a VNF may provide the network function of a firewall or an evolved packet core (EPC) of an LTE-A network. A VNF is developed by a VNF provider, who provides a VNF software package and associated licenses for use to a network service provider.

Each VNF is composed of one or more Virtualised Network Function Components (VNFC). A VNFC is an internal component of a VNF providing a defined sub-set of that VNF's functionality. A run-time instantiation of a VNF software package is referred to as a VNF instance. A VNF instance results from completing instantiation of the VNFCs of the VNF and of the connectivity between them, in accordance with run-time instance-specific information and constraints. The functionalities enabled in a network slice by a VNF may be adjusted by instantiating or not instantiating a VNFC, thereby selectively enabling the sub-set of that VNF's functionality defined by the VNFC.

As such, each VNF instance may be considered as an example or instance of the product (that is, the type of physical device, appliance, node or other network function) defined by the VNF software package provided by the VNF provider.

In order to automatically monitor, control, and enforce how a VNF is used in the network of a service provider, the network normally further includes a further server to assist in the automatic deployment of network slices and VNFs within a network. In particular, in addition to a traditional license in the form of a written contract or agreement between the VNF provider and the network service provider, a plurality of activation codes may be loaded to an activation code management server.

Figure 1A:
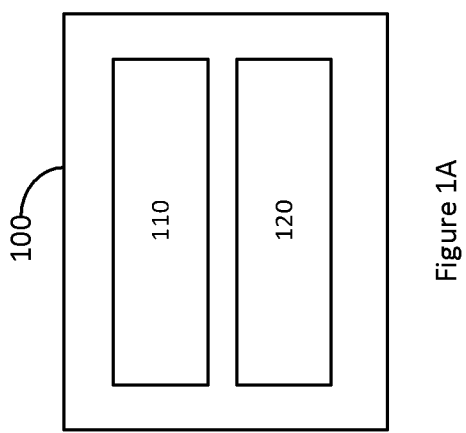
FIG. 1A is a schematic illustration of an activation code management server configured to manage a plurality of activation codes referring to at least one VNF in a network, the network including a plurality of network slices, according to an example aspect herein.

FIG. 1A is a schematic illustration of an activation code management server 100 configured to manage a plurality of activation codes 511-562 (shown in FIGS. 5A and 5B) referring to at least one VNF in a network, the network including a plurality of network slices, according to an example aspect herein. The activation code management server 100 comprises a storage module 110 and a processing module 120.

The processing module 120 is configured to provide, for each of the plurality of network slices, a network slice identifier 570 (shown in FIGS. 5A and 5B) in correspondence with a network slice; to provide at least one VNF-product identifiers 580 (shown in FIGS. 5A and 5B), each VNF-product identifier 580 being in correspondence with a VNF; and to provide a plurality of activation code indicators 510, 520, 530, 540, 550, 560 (shown in FIGS. 5A and 5B), each activation code indicator being indicative of one or more of the plurality of activation codes 511-562.

The processing module is further configured to associate, at the server, each of the plurality of activation code indicators 510, 520, 530, 540, 550, 560 with a corresponding network slice identifier 570 and a corresponding VNF-product identifier 580.

A network slice identifier 570 may be any suitable type of identifier known to those skilled in the art that provides sufficient information to uniquely identify a network slice, at least among the plurality of network slices in a network of a particular network service provider. In some example aspects, a network slice identifier 570 may provide sufficient information to uniquely identify a network slice among the network slices in two or more networks. By way of example, each network slice identifier 570 may be composed of alphanumeric characters, a binary value, etc.

A VNF-product identifier 580 may be any suitable type of identifier known to those skilled in the art that provides sufficient information to uniquely identify a VNF (that is, the type of physical device, appliance, node or other network function defined by a particular VNF software package). A VNF-product identifier 580 may uniquely identify a VNF among a set plurality of VNFs (e.g. the VNFs for which the activation code management server 100 stores activation codes 511-562). Alternatively, a VNF-product identifier 580 may uniquely identify a VNF in general (e.g. in a manner similar to a digital object identifier number. By way of example, each VNF-product identifier 580 may be composed of alphanumeric characters, a binary value, etc.

Each activation code 511-562 may refer to one or more features, characteristics or functionalities of the VNF or of how the VNF may be used. That is, each activation code 511-562 may enable one or more instances of a VNF to be instantiated in a network slice and/or enables one or more functionalities in an instantiated VNF. The VNF and the network slice in which the VNF is instantiated may be identified by a VNF-product identifier 580 and a network slice identifier 570, respectively, with which an activation code indicator 510, 520, 530, 540, 550, 560 indicative of the activation code 511-562 is associated.

The one or more features, characteristics or functionalities to which each activation code 511-562 refers may be selected by a user (e.g. the VNF provider, the network service provider, or a third party) who provides the activation codes 511-562 (directly or via another network entity) to the activation code management server 100 based on the terms of at least one license between the VNF provider and the network service provider.

By way of example, the plurality of activation codes 511-562 may comprise at least one activation code 511-562 configured to enable up to a maximum number of instances of a VNF to be instantiated; at least one activation code 511-562 configured to enable one or more instances of a VNF to be instantiated in a predetermined location (e.g. country, a town, a campus, a building and/or any other area); at least one activation code 511-562 configured to enable one or more instances of a VNF to be instantiated for use by multiple users in a case where the number of users does not exceed a maximum number (e.g. the feature may be a maximum capacity); and/or at least one activation code 511-562 configured to enable one or more instances of a VNF to be instantiated during a predetermined period of time (e.g. one year, two years, five years, etc).

Additionally, or alternatively, the features, characteristics or functionalities to which an activation code 511-562 refers may include, in the case where the network slice is a radio communications network, an activation code 511-562 may dictate the frequency bands for which the function enabled in in the network slice by the VNF instance may be used. The activation code 511-562 may dictate a volume of traffic or a number of users that may be served by the VNF.

By way of further example, in case where a VNF among the at least one VNF is configured to enable a function comprising a plurality of functionalities in a network slice when instantiated, an instance of the VNF, associated with an activation code 511-562 of the plurality of activation codes 511-562, may enable a subset of the plurality of functionalities in a network slice. The subset of functionalities enabled may be in accordance with a corresponding network slice identifier 570 with which the activation code indicator 510, 520, 530, 540, 550, 560 indicative of the activation code 511-562 and associated with a VNF-product identifier 580 corresponding to the VNF is associated. For example, an activation code 511-562 may refer to enabling features like packet filtering, traffic detection in a firewall VNF and an activation code 511-562 associated with a particular network slice may only enable the packet filtering feature to be enabled in an instance of the firewall VNF in that network slice.

Each activation code 511-562 may be associated with multiple features, characteristics or functionalities in any suitable combination.

Each combination of a network slice identifier 570 and a VNF-product identifier 580 may be associated with one or more activation codes 511-562. Accordingly, each combination of a network slice identifier 570 and a VNF-product identifier 580 is associated with an activation code indicator 510, 520, 530, 540, 550, 560 that is indicative of one or more of the plurality of activation codes 511-562. These one or more activation codes 511-562 are the activation codes 511-562 with which that combination of a network slice identifier 570 and a VNF-product identifier 580 are associated.

The activation codes associated with a respective combination of a network slice identifier 570 and a VNF-product identifier 580 may serve as codes, keys, flags, identifiers, etc, for use in automatically monitoring, controlling, and enforcing how a VNF is used. This will be discussed in more detail in relation to FIGS. 6A and 6B below.

Figure 1B:
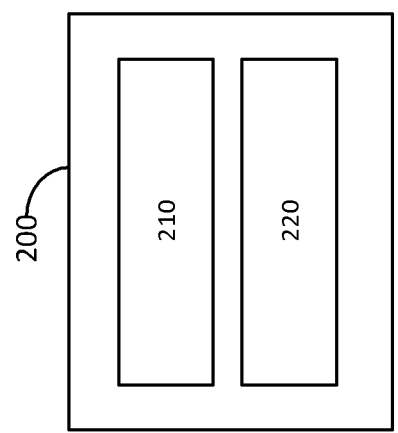
FIG. 1B is a schematic illustration of a network entity configured to manage at least one VNF of a network including a plurality of network slices, according to an example aspect herein.

FIG. 1B is a schematic illustration of a network entity 200 configured to manage at least one VNF of a network including a plurality of network slices, according to an example aspect herein. The network entity 200 comprises a storage module 210 and a processing module 220.

The processing module 220 is configured to transmit, to an activation code management server, such as the activation code management server 100 shown in FIG. 1A and that is configured to manage a plurality of activation codes 511-562, a request to enable a function of a first VNF among the at least one VNF in a first network slice among the plurality of network slices, the request comprising information indicative of the first VNF and the first network slice.

The processing module 220 is further configured to receive, from the server 100, an activation code indicator 510, 520, 530, 540, 550, 560 that is associated with a VNF-product identifier 580 corresponding to the first VNF and a network slice identifier 570 corresponding to the first network slice, the activation code indicator 510, 520, 530, 540, 550, 560 being indicative of one or more of the plurality of activation codes 511-562.

The network entity 200 may be any suitable device (physical or virtual) or functional module in the network of a network service provider that may interact with an activation code management server 100, such as that shown in FIG. 1A.

In particular, the network entity 200 may be, for example, an instance of the first VNF or an instance of any other VNF on the first network slice. Alternatively, the network entity 200 may be an instance of the first VNF or an instance of any other VNF on any other network slice in the network of the network service provider. By way of further alternative, the network entity 200 may be any suitable entity in the network of the network service provider, such as, one of one or more of a NFV MANO, a NFVO, a VNFM, an EM and an OSS/BSS. The network entity may be provided with any further modules necessary, further to those discussed above, to perform the functions of that entity.

It should be noted that the activation code management server 100 of FIG. 1A may be associated with the network of a single network service provider only. Alternatively, the activation code management server 100 may be associated with a plurality of networks belonging to different respective network service providers.

In addition, in a case where the activation code management server 100 of FIG. 1A may be associated with the network of a single network service provider only, the activation code management server 100 may be provided as an independent network entity. Alternatively, the activation code management server 100 may be provided as part of any of the above discussed network entities of the network with which it is associated.

The storage module 120 and the processing module 120 of the activation code management server 100 of FIG. 1A and the storage module 210 and the processing module 220 of the network entity 200 of FIG. 1B may be implemented by any suitable means known to those skilled in the art.

By way of example, the processing module 120 of the activation code management server 100 of FIG. 1A and/or the processing module 220 of the network entity 200 of FIG. 1B may comprise one or more microprocessors and/or microcontrollers, as well as other digital hardware, which may include digital signal processors (DSPs), special-purpose digital logic, and/or any other suitable hardware, software or firmware. The processing module 120 of the activation code management server 100 of FIG. 1A and/or the processing module 220 of the network entity 200 of FIG. 1B may be configured to perform the above functions by executing a computer program code or computer program stored in the corresponding storage module or in any other suitable way.

The storage module 110 of the activation code management server 100 of FIG. 1A and/or the storage module 210 of the network entity 200 of FIG. 1B may be provided as one or several types of memory such as read-only memory (ROM), random-access memory, cache memory, flash memory devices, optical storage devices, etc.

By way of particular example, FIG. 2 is a block diagram illustrating an example signal processing hardware configuration of the apparatus of FIG. 1A or FIG. 1B, according to an example aspect herein.

The programmable signal processing hardware 20 comprises a communication interface (I/F) 21. The signal processing apparatus 20 further comprises a processor (e.g. a Central Processing Unit, CPU) 22, a working memory 23 (e.g. a random access memory) and an instruction store 24 storing a computer program comprising the computer-readable instructions which, when executed by the processor 22, cause the processor 22 to perform various functions including those of the processing module 120 described above in relation to FIG. 1A or those of the processing module 220 described above in relation to FIG. 1B. The instruction store 24 may comprise a ROM (e.g. in the form of an electrically-erasable programmable read-only memory (EEPROM) or flash memory) which is pre-loaded with the computer-readable instructions. Alternatively, the instruction store 24 may comprise a RAM or similar type of memory, and the computer-readable instructions of the computer program can be input thereto from a computer program product, such as a non-transitory, computer-readable storage medium 25 in the form of a CD-ROM, DVD-ROM, etc. or a computer-readable signal 26 carrying the computer-readable instructions. In any case, the computer program, when executed by the processor, causes the processor to execute at least one of the methods for monitoring the performance of a plurality of network nodes using at least one node performance assessment threshold described herein. It should be noted, however, that the apparatus 20 may alternatively be implemented in non-programmable hardware, such as an application-specific integrated circuit (ASIC).

Alternatively, in some example aspects, the activation code management server 100 of FIG. 1A and/or the network entity 200 of FIG. 1B may be implemented by a computer program comprising instructions, which, when executed by a computer, cause the computer to perform said process or processes. Such a computer program may be stored on a non-transitory computer-readable storage medium or carried by a signal. By way of alternative, the activation code management server 100 of FIG. 1A and/or the network entity 200 of FIG. 1B may be implemented by mobile computing device comprising a processor and a memory, wherein the memory is configured to store instructions which, when executed by the processor, cause the processor to perform said process or processes.

By way of further alternative, the activation code management server 100 of FIG. 1A and/or the network entity 200 of FIG. 1B may be implemented as a virtual machine (VM) having all the elements (processor, memory/storage, interfaces/ports) of a physical computer/server and that is generated by a Hypervisor, which partitions the VM from the underlying physical resources. Alternatively, the activation code management server 100 of FIG. 1A and/or the network entity 200 of FIG. 1B may be implemented as a virtual application (VA), that is, a piece of software which can be loaded into a VM.

Figure 3:
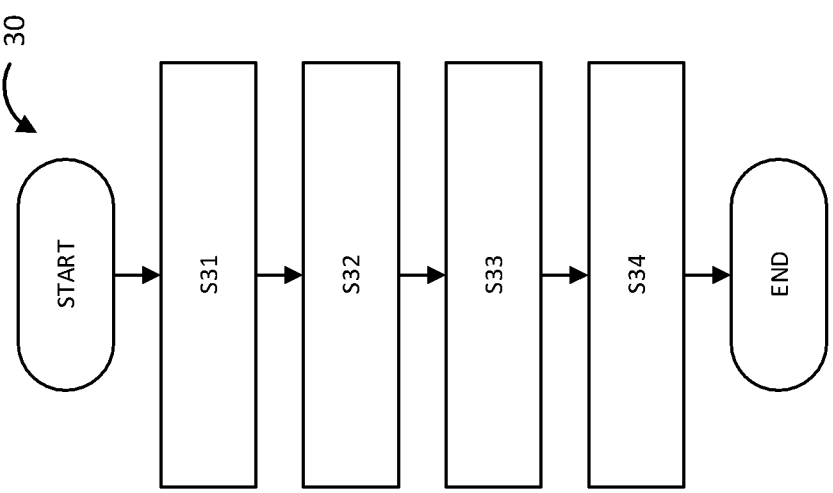
FIG. 3 is a flow diagram illustrating a process by which the activation code management server of FIG. 1A may manage a plurality of activation codes referring to at least one VNF in a network including a plurality of network slices, according to a first example aspect herein.

FIG. 3 is a flow diagram illustrating a process by which the activation code management server 100 of FIG. 1A may manage a plurality of activation codes 511-562 referring to at least one VNF in a network including a plurality of network slices, according to a first example aspect herein.

In process step S31 of FIG. 3, the processing module 12 provides, for each of the plurality of network slices, a network slice identifier 570 in correspondence with a network slice.

In some example aspects, the processing module 120 may be configured to generate or produce a network slice identifier 570 in respect of each network slice of the plurality of network slices and then assign the generated identifiers to the respective network slices. Alternatively, the activation code management server 100 may be configured to receive a plurality of network slice identifiers 570 from a network entity, such as network entity 200 shown in FIG. 1B, in the network of a network service provider and then assign the received identifiers to the respective network slices.

In such example aspects, the activation code management server 100 may be configured to receive the plurality of network slice identifiers or any other data by any suitable means known to those versed in the art. By way of example, processing module 120, may read the data from a storage medium such as a CD or hard disk which may be used to transfer information or to receive data via network such as the Internet. Furthermore, processing module 120 may receive data via a direct communication link (which may be provided by any suitable wired or wireless connection, e.g. a Universal Serial Bus (USB) or a Bluetooth™ connection), or an indirect communication link (which may be provided by a network comprising a Local Area Network (LAN), a Wide Area Network (WAN) and/or the Internet).

The activation code management server 100 may further comprise any suitable means (physical or virtual) necessary to enable the processing module 120 to obtain data, such as, for example, one or more transmitters and receivers, peripheral devices, interfaces (such as serial and/or parallel ports).

Figure 5A:
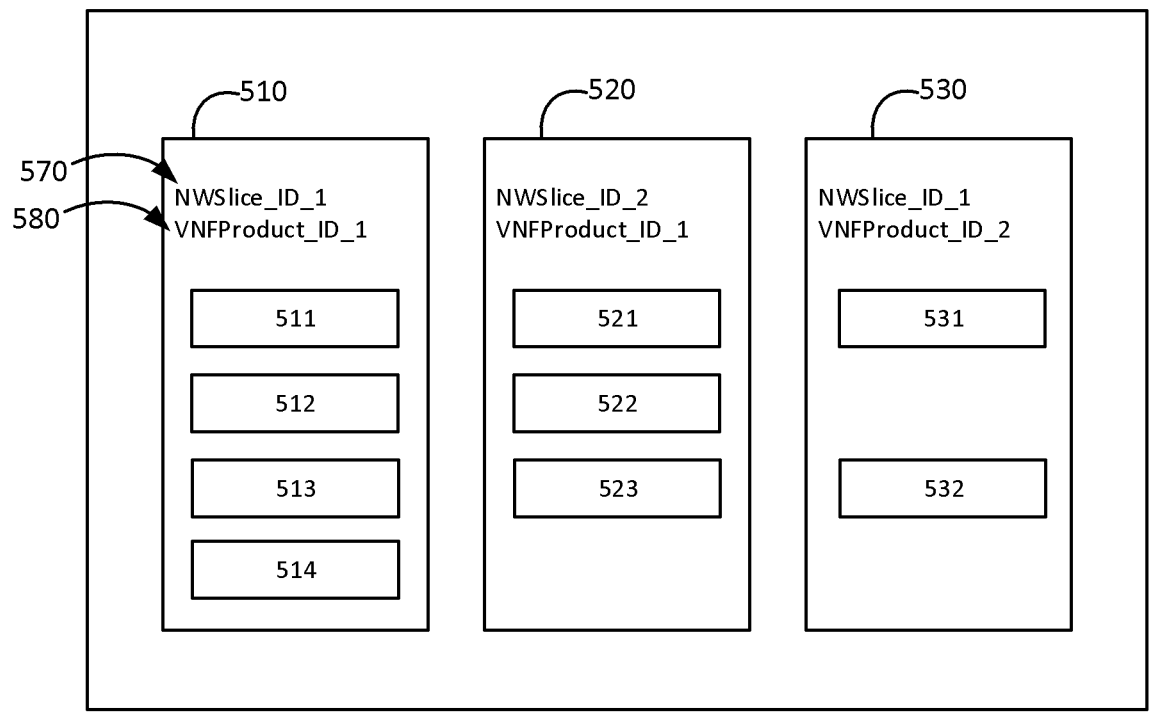
FIG. 5A is a block diagram illustrating activation code indicator(s), according to a first example aspect herein.

FIG. 5A is a block diagram illustrating an activation code indicator (there might be more than one code indicator, as shown in the figure(s) for illustrative purposes), according to a first example aspect herein. In the example aspect of FIG. 5A, two exemplary network slice identifiers 570 are shown: "NWSlice_ID_1" and "NWSlice_ID_2". By way of example, NWSlice_ID_1 may be indicative of a mobile network slice and NWSlice_ID_2 may be indicative of an IoT or fixed network slice. Alternatively, the processing module 120 may provide three or more network slice identifiers 570.

In process step S32 of FIG. 3, the processing module 120 provides at least one VNF-product identifiers 580, each VNF-product identifier 580 being in correspondence with a VNF.

In some example aspects, the processing module 120 may be configured to generate or produce a VNF-product identifier 580 in respect of each VNF and then assign the generated identifiers to the respective network slices; as also below discussed, in other examples, the VNF-product identifier may be generated or produced by another entity, e.g. by a VNF provider; in other examples, the identifier may be generated by the processing module 120 on the basis of an activation code generated by the VNF provider. By way of example, the processing module 120 may provide a VNF-product identifier for each VNF among a set plurality of VNFs (e.g. the VNFs for which the activation code management server 100 stores activation codes 511-562).

Alternatively, the activation code management server 100 may be configured to receive a plurality of VNF-product identifiers 580 from, for example, the respective VNF providers, and then assign the received identifiers to the respective VNFs. In such cases, the activation code management server 100 may be configured to receive the plurality of VNF-product identifiers by any of the means discussed above.

In the example aspect of FIG. 5A, two exemplary VNF-product identifiers 570 are shown: "VNFProduct_ID_1" and "VNFProduct_ID_2". By way of example, VNFProduct_ID_1 may be indicative of a firewall VNF and VNFProduct_ID_2 may be indicative of an EPC VNF. Alternatively, the processing module 120 may provide three or more VNF-product identifiers 570, or only one.

In process step S33 of FIG. 3, the processing module 120 provides a plurality of activation code indicators 510, 520, 530, 540, 550, 560, each activation code indicator 510, 520, 530, 540, 550, 560 being indicative of one or more of the plurality of activation codes 511-562. An activation code indicator is an indicator that allows determining the activation codes associates with it. For example, an activation code indicator may be a reference to a set of activation codes, e.g. by way of an index (an example of a reference) associated with a set containing one or more activation codes; in another example, the activation code indicator may include references to the activation codes associated with the indicator; in another example, the activation code indicator may include the associated activation codes.

Optionally, the processing module 120 may further provide one or more additional activation code indicators 510, 520, 530, 540, 550, 560, indicative of zero activation codes 511-562 or a NULL set, for associating to combinations of a network slice identifier 570 and a VNF-product identifier for which the activation code management server 100 does not manage any associated activation codes.

In the example aspect of FIG. 5A, three activation code indicators 510, 520, and 530 are shown. Activation code indicator 510 is indicative of activation codes 511, 512, 513 and 514. Activation code indicator 520 is indicative of activation codes 521, 522 and 523. Activation code indicator 530 is indicative of activation codes 531 and 532. Alternatively, the processing module 120 may provide one activation code indicator, two activation code indicators or four or more activation code indicators.

In process step S34 of FIG. 3, the processing module 120 associates each of the plurality of activation code indicators 510, 520, 530, 540, 550, 560 with a corresponding network slice identifier 570 and a corresponding VNF-product identifier 580.

The processing module 120 may be configured to associate an activation code indicator 510, 520, 530, 540, 550, 560 with a corresponding network slice identifier 570 and a corresponding VNF-product identifier 580 in any suitable way. By way of example, the processing module 120 may be configured to associate an activation code indicator 510, 520, 530, 540, 550, 560 with a corresponding network slice identifier 570 and a corresponding VNF-product identifier 580 by storing the activation code indicator 510, 520, 530, 540, 550, 560, the corresponding network slice identifier 570 and the corresponding VNF-product identifier 580 in association (e.g. in a same part of the storage module 110). Alternatively, the processing module 120 may be configured to associate an activation code indicator 510, 520, 530, 540, 550, 560 with a corresponding network slice identifier 570 and a corresponding VNF-product identifier 580 by storing a list, lookup table or other suitable indicator of each set of an associated activation code indicator 510, 520, 530, 540, 550, 560, corresponding network slice identifier 570 and corresponding VNF-product identifier 580.

In the example aspect of FIG. 5A, activation code indicator 510 is associated with network slice identifier NWSlice_ID_1 and VNF product identifier VNFProduct_ID_1. Similarly, activation code indicator 520 is associated with network slice identifier NWSlice_ID_2 and VNF product identifier VNFProduct_ID_1 and activation code indicator 530 is associated with network slice identifier NWSlice_ID_1 and VNF product identifier VNFProduct_ID_2.

That is, the activation code management server 100 manages activation codes for an EPC VNF and a Firewall in respect of the mobile network slice indicated by network slice identifier NWSlice_ID_1 and manages activation codes for a firewall VNF in respect of the IoT network indicated by NWSlice_ID_2.

Accordingly, as the activation codes 511-532 indicated by each activation code indicator 510, 520, 530 are associated with a particular network slice indicated by a corresponding network slice identifier 570, it is possible to monitor, control, and enforce how VNFs are used in network slicing in a way that both guarantees the isolation of each network slice and provides the advantages of improved programmability, flexibility, and modularity.

In particular, the process 30 of FIG. 3 ensures that any issues in the management of activation codes in respect of a single network slice (which may prevent or hinder VNFs being deployed or additional functionalities being enabled in a VNF instance) will not propagate between multiple network slices in which the VNF is instantiated.

Furthermore, the process 30 of FIG. 3 avoids the need to provide a separate activation code management server 100 in respect of each license slice. Accordingly, the process 30 ensures higher levels of programmability, flexibility, and modularity relative to some conventional approaches.

Figure 4:
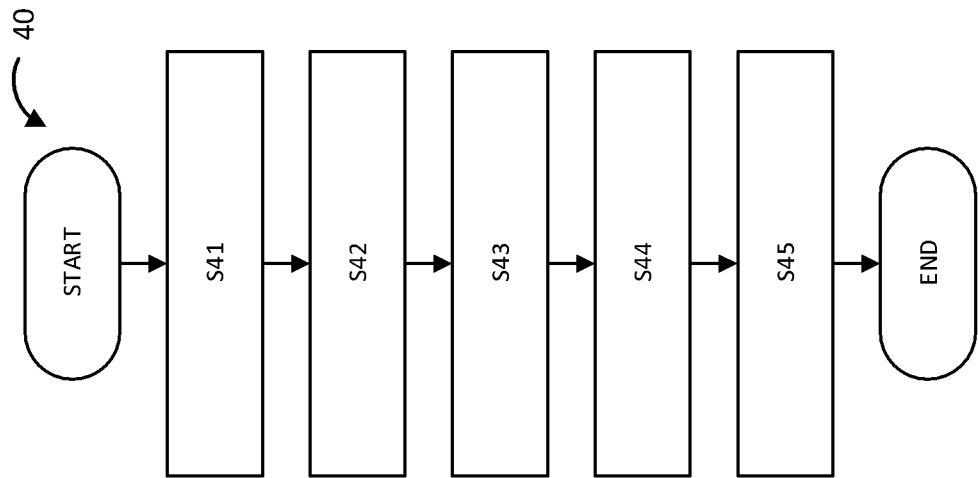
FIG. 4 is a flow diagram illustrating a process by which the activation code management server of FIG. 1A may manage a plurality of activation codes referring to at least one VNF in a network including a plurality of network slices, according to a second example aspect herein.

FIG. 4 is a flow diagram illustrating a process by which the activation code management server 100 of FIG. 1A may manage a plurality of activation codes 511-562 referring to at least one VNF in a network including a plurality of network slices, according to a second example aspect herein.

In the example aspect of FIG. 4, the activation code management server 100 is further adapted to manage a plurality of activation codes on behalf of a plurality of network service providers (operators). In this case, each of the plurality of network slices is associated with a respective operator of a plurality of operators.

In process step S41 of FIG. 4, the processing module 120 provides, for each of the plurality of network slices, a network slice identifier 570 in correspondence with a network slice. Process step S41 corresponds to process step S31 of FIG. 3 as discussed above.

Figure 5B:
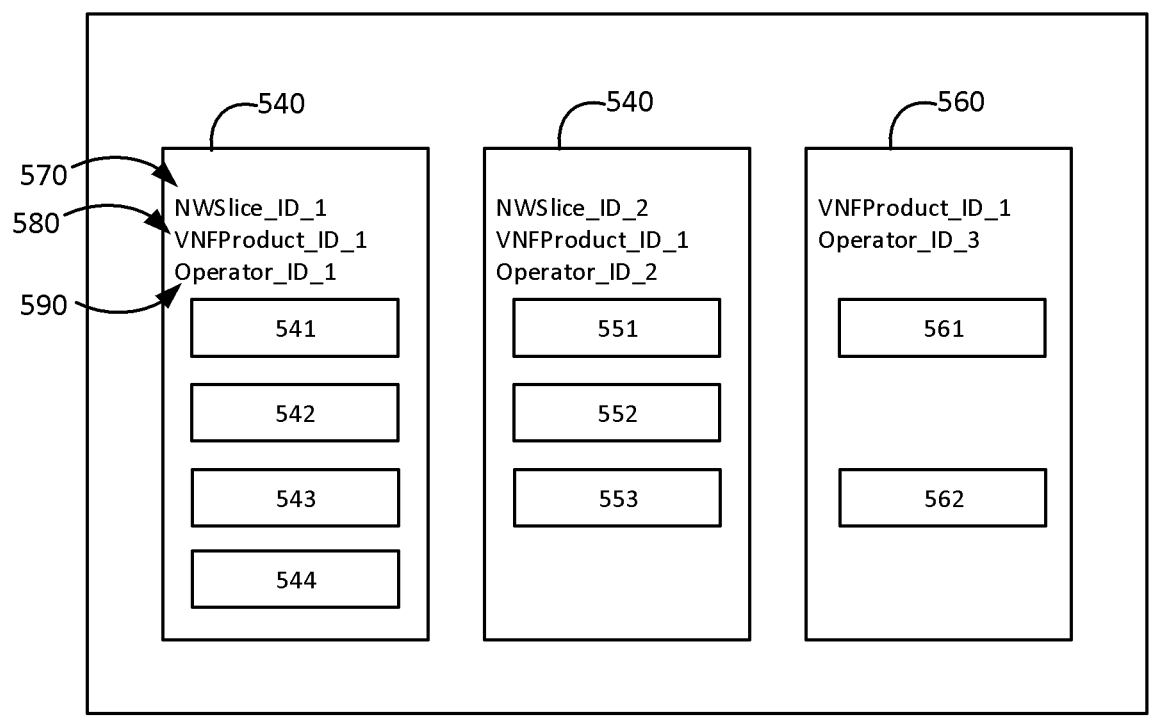
FIG. 5B is a block diagram illustrating activation code indicator(s), according to a second example aspect herein.

FIG. 5B is a block diagram illustrating an activation code indicator, according to a second example aspect herein. In the example aspect of FIG. 5B, two exemplary network slice identifiers 570 are shown: "NWSlice_ID_1" and "NWSlice_ID_2". By way of example, NWSlice_ID_1 may be indicative of a mobile network slice and NWSlice_ID_1 may be indicative of an IoT or fixed network slice. Alternatively, the processing module 120 may provide two or more network slice identifiers 570.

In process step S42 of FIG. 4, the processing module 120 provides at least one VNF-product identifiers 580, each VNF-product identifier 580 being in correspondence with a VNF. Process step S42 corresponds to process step S32 of FIG. 3 as discussed above.

In the example aspect of FIG. 5A, one exemplary VNF-product identifiers 570 is shown: "VNFProduct_ID_1". By way of example, VNFProduct_ID_1 may be indicative of a firewall VNF or an EPC VNF. Alternatively, the processing module 120 may provide two or more VNF-product identifiers 570.

In process step S43 of FIG. 4, the processing module 120 provides, for each of the plurality of operators, an operator identifier 590 in correspondence with the operator.

In some example aspects, the processing module 120 may be configured to generate or produce an operator identifier 590 in respect of each operator (network service provider) and then assign the generated identifiers to the respective operators. By way of example, the processing module 120 may provide an operator identifier for each operator for which the activation code management server 100 stores activation codes 511-562).

Alternatively, the activation code management server 100 may be configured to receive a plurality of operator identifiers 590 from, for example, the respective network service providers, and then assign the received identifiers to the respective operators. In such cases, the activation code management server 100 may be configured to receive the plurality of operator identifiers 590 by any of the means discussed above in relation to process step S31 of FIG. 3.

In the example aspect of FIG. 5B, three exemplary operator identifiers 590 are shown: "Operator_ID_1", "Operator_ID_2" and "Operator_ID_3". Alternatively, the processing module 120 may provide one operator identifier, two operator identifiers or four or more operator identifiers.

In process step S44 of FIG. 4, the processing module 120 provides a plurality of activation code indicators 510, 520, 530, 540, 550, 560, each activation code indicator 510, 520, 530, 540, 550, 560 being indicative of one or more of the plurality of activation codes 511-562. Process step S44 corresponds to process step S33 of FIG. 3 as discussed above.

In the example aspect of FIG. 5B, three activation code indicators 540, 550, and 560 are shown. Activation code indicator 540 is indicative of activation codes 541, 542, 543 and 544. Activation code indicator 550 is indicative of activation codes 551, 552 and 553. Activation code indicator 560 is indicative of activation codes 561 and 562. Alternatively, the processing module 120 may provide one activation code indicator, two activation code indicators or four or more activation code indicators.

In process step S45 of FIG. 4, the processing module 120 associates each of the plurality of activation code indicators 510, 520, 530, 540, 550, 560 with a corresponding network slice identifier 570, a corresponding VNF-product identifier 580 and a corresponding operator identifier 590.

Process step S45 corresponds to process step S34 of FIG. 3 as discussed above. The processing module 120 may be configured to associate an activation code indicator 510, 520, 530, 540, 550, 560 with a corresponding network slice identifier 570, a corresponding VNF-product identifier 580 and a corresponding operator identifier 590 by any of the means discussed above in relation to process step S34 of FIG. 3.

In the example aspect of FIG. 5B, activation code indicator 540 is associated with network slice identifier NWSlice_ID_1, VNF product identifier VNFProduct_ID_1 and operator identifier Operator_ID_1. Similarly, activation code indicator 550 is associated with network slice identifier NWSlice_ID_2, VNF product identifier VNFProduct_ID_2 and operator identifier Operator_ID_2.

Activation code indicator 560 is associated with VNF product identifier VNFProduct_ID_1 and operator identifier Operator_ID_3. That is, the operator indicated by operator identifier Operator_ID_3 may operate a legacy network (e.g. one in which network slicing is not applied or one in which network slices are not uniquely identified or identifiable by the activation code management server 100). Accordingly, the activation code management server 100 may be further adapted to be compatible with such legacy systems.

By way of example, this backwards compatibility may be achieved by, in a case where no network slice identifiers 570 or network slice information in general is available for a particular operator, associating an activation code indicator, such as activation code indicator 560 in FIG. 5B, with a VNF-product identifier and an operator identifier only or associating an activation code indicator, such as activation code indicator 560 in FIG. 5B, with a NULL value as the network slice identifier 570.

Similar to process 30 of FIG. 3, process 40 of FIG. 4 allows for monitoring, controlling, and enforcing of how VNFs are used in network slicing in a way that both guarantees the isolation of each network slice and provides the advantages of improved programmability, flexibility, and modularity.

In addition, the process 40 of FIG. 4 allows a single activation code management server 100 to manage the activation codes 541-562 of a plurality of operators. Accordingly, the process 40 of FIG. 4 offers further improvements in terms of flexibility and efficient use of resources as it is not necessary to provide multiple similar or identical activation code management servers.

Furthermore, the process 40 of FIG. 4 enables backwards compatibility with legacy networks in which network slicing is not applied or one in which network slices are not uniquely identified or identifiable by the activation code management server 100.

Figure 6A:
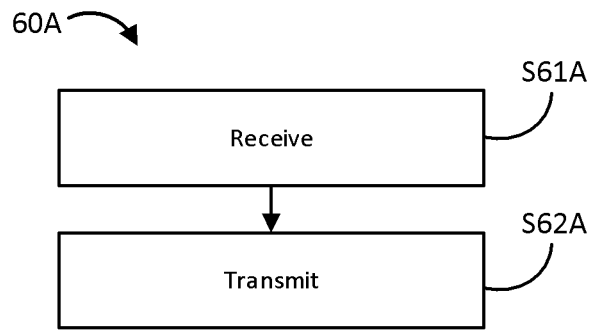
FIG. 6A is a flow diagram illustrating a process by which the activation code management server of FIG. 1A may provide an activation code indicator to a network entity, according to an example aspect herein.

The activation code management server 100 may be configured to interact with network entities, such as network entity 200 shown in FIG. 1. FIG. 6A is a flow diagram illustrating a process 60A by which the activation code management server 100 of FIG. 1A may provide an activation code indicator 510, 520, 530, 540, 550, 560 to a network entity, according to an example aspect herein.

In process step S61A of process 60A of FIG. 6A, the processing module 120 of the activation code management server 100 receives, from a network entity, a request to enable a function of a VNF among the at least one VNF comprising information indicative of the VNF and a network slice among the plurality of network slices.

The network entity may, as in the present example aspect, be the network entity 200 shown in FIG. 1B. Alternatively, the network entity may be any other network entity (e.g. a NFV MANO, a NFVO, a VNFM, an EM, an OSS/BSS or a VNF instance) in a network for which the activation code management server 100 manages activation codes.

The request to enable a function of a VNF in the network slice may be, for example, a request to enable a VNF to be instantiated in that network slice or a request to enable one or more additional or alternative functionalities in a VNF instance in that network slice. As will be discussed in more detail below, an activation codes may enable instantiation or use of a functionality by, for example, providing authorization or permission to do so (e.g. the validity or some property of the activation code is checked prior to instantiation or enabling a functionality in a VNF).

The processing module 120 may be configured to receive the request by controlling any necessary elements, such as, for example, one or more receivers, transceivers, peripheral devices, interfaces (such as serial and/or parallel ports), and/or additional processing modules (e.g. base band units, demodulators, decoders, decryption units, etc.) to perform the reception. Such elements may be provided as part of the activation code management server 100 or may be controllable by the processing module 120 of the activation code management server 100.

The information indicative of the VNF and a network slice among the plurality of network slices may take any suitable form known to those skilled in the art. By way of example, in a case where one or both of the corresponding VNF-product identifier 580 and the corresponding network slice identifier 570 are available to the network entity 200, information indicative of the VNF and the network slice may comprise the corresponding VNF-product identifier 580 and/or the corresponding network slice identifier 570.

By way of alternative, the information indicative of the VNF may include any other means of uniquely identifying the VNF indicated by the VNF-product identifier 580 (e.g. a description of the physical device, appliance, node or other network function which is represented by the VNF, an index to a list of known VNFs, etc.). Similarly, the information indicative of the network slice may include any other means of uniquely identifying the network slice (e.g. an index in a list of network slices, a serial number, etc.).

In cases where the activation code management server 100 is further adapted to manage a plurality of activation codes on behalf of a plurality of network service providers (operators) and each of the plurality of network slices is associated with a respective operator of a plurality of operators, the request to enable a function of the VNF may include information indicative of any operator among the plurality of operators. The information indicative of the operator may take any suitable form, including those discussed above in relation to the information indicative of the VNF and a VNF slice.

By way of example, with regard to the example aspect of FIG. 5B, the network entity may receive a request to enable a function of a VNF including information indicative of a firewall VNF (for which a VNF-product identifier VNFProduct_ID_1 is provided at the activation code management server 100) and of a mobile network slice (for which a network slice identifier NWSlice_ID_1 is provided at the activation code management server 100) belonging to an operator (for whom an operator identifier Operator_ID_1 is provided at the activation code management server 100).

In process step S62A of process 60A of FIG. 6A, the processing module 120 transmits, to the network entity, an activation code indicator 510, 520, 530, 540, 550, 560 that is associated with a VNF-product identifier 580 corresponding to the VNF and a network slice identifier 570 corresponding to the network slice.

In some example aspects, the processing module 120 may be configured to identify an activation code indicator 510, 520, 530, 540, 550, 560 that is associated with the VNF and the network slice indicated by the information included in the request by identifying a VNF-product identifier 580 corresponding to the VNF, a network slice identifier 570 corresponding to the network slice and then identifying an activation code indicator 510, 520, 530, 540, 550, 560 which is associated with that VNF-product identifier 580 and that network slice identifier 570.

In example aspects where the request further includes information indicative of an operator, the processing module 120 further identifies the activation code indicator 510, 520, 530, 540, 550, 560 to be transmitted to the network entity 200 as one which is further associated with an operator identifier 590 corresponding to the operator indicated in the information included in the request.

By way of example, in response to a request including information indicative of the firewall VNF corresponding to the VNF-product identifier VNFProduct_ID_1 at the activation code management server 100, the mobile network slice corresponding to network slice identifier NWSlice_ID_1 at the activation code management server 100, and the operator corresponding to operator identifier Operator_ID_1 at the activation code management server 100, the processing module 120 may transmit activation code indicator 540 in FIG. 5B to the network entity 200.

In general, an activation code indicator 510, 520, 530, 540, 550, 560 may be transmitted in any suitable form known to those skilled in the art. For example, an activation code indicator 510, 520, 530, 540, 550, 560 may be transmitted as a string comprising each of the activation codes indicated by that string and, optionally, a header portion.

The processing module 120 may be configured to transmit the activation code indicator 510, 520, 530, 540, 550, 560 to the network entity 200 by any suitable means, such as, for example, via a radio communication network or via a wired connection. In particular, the processing module 120 may be configured to transmit the activation code indicator 510, 520, 530, 540, 550, 560 by controlling any necessary elements, such as, for example, one or more transmitters, peripheral devices, interfaces (such as serial and/or parallel ports), and/or additional processing modules (e.g. base band units, modulators, mapping sections, encoders, encryption units, etc.) to perform the transmission. Such elements may be provided as part of the activation code management server 100 or may be controllable by the processing module 120 of the activation code management server 100.

Optionally, in cases where the request to enable a function of a VNF does not include information indicative of a network slice, the processing module 120 may be adapted to identify an activation code indicator 560 that is associated with the VNF and the operator indicated by the information included in the request by identifying a VNF-product identifier 580 corresponding to the VNF, an operator identifier 590 corresponding to the operator and then identifying an activation code indicator 560 which is associated with that VNF-product identifier 580 and that operator identifier 590, but which is not associated with any network slice identifier 570 or which is associated with a network slice identifier 570 having a NULL value. This may allow the activation code management server 100 to provide backward compatibility with legacy networks in which network slicing is not applied or one in which network slices are not uniquely identified or identifiable by the activation code management server 100.

Figure 6B:
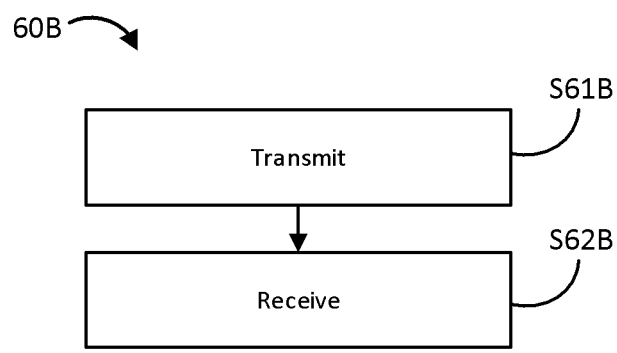
FIG. 6B is a flow diagram illustrating a process by which the network entity of FIG. 1B may obtain an activation code indicator from an activation code management server, according to an example aspect herein.

FIG. 6B is a flow diagram illustrating a corresponding process 60B by which the network entity 200 of FIG. 1B may obtain an activation code indicator 510, 520, 530, 540, 550, 560 from the activation code management server 100, according to an example aspect herein.

In process step S61B of process 60B of FIG. 6B, the processing module 220 of the network entity 200 transmits, to the activation code management server 100 configured to manage a plurality of activation codes 511-562, a request to enable a function of a VNF among the at least one VNF in a network slice among the plurality of network slices, the request comprising information indicative of the VNF and the network slice.

The information comprised in the request may take any of the forms discussed above in relation to process step S61A of FIG. 6A.

The processing module 220 may be configured to transmit the request to the activation code management server 100 by any suitable means, such as, for example, via a radio communication network or via a wired connection. In particular, the processing module 220 may be configured to transmit the request by controlling any necessary elements, such as, for example, one or more transmitters, peripheral devices, interfaces (such as serial and/or parallel ports), and/or additional processing modules (e.g. base band units, modulators, mapping sections, encoders, encryption units, etc.) to perform the transmission. Such elements may be provided as part of the network entity 200 or may be controllable by the processing module 220 of the network entity 200.

In process step S62B of process 60B of FIG. 6B, the processing module 220 receives, from the server 100, an activation code indicator 510, 520, 530, 540, 550, 560 associated with a VNF-product identifier 580 corresponding to the VNF and a network slice identifier 570 corresponding to the network slice, the activation code indicator 510, 520, 530, 540, 550, 560 being indicative of one or more of the plurality of activation codes 511-562.

The processing module 220 may be configured to receive the activation code indicator 510, 520, 530, 540, 550, 560 by controlling any necessary elements, such as, for example, one or more receivers, transceivers, peripheral devices, interfaces (such as serial and/or parallel ports), and/or additional processing modules (e.g. base band units, demodulators, decoders, decryption units, etc.) to perform the reception. Such elements may be provided as part of the network entity 200 or may be controllable by the processing module 220 of the network entity 200.

By way of example, with reference to FIG. 5B, the processing unit of the network entity 200 may transmit a request including information indicative of a firewall VNF corresponding to the VNF-product identifier VNFProduct_ID_1 at the activation code management server 100, a mobile network slice corresponding to network slice identifier NWSlice_ID_1 at the activation code management server 100, and an operator corresponding to operator identifier Operator_ID_1 at the activation code management server 100, who operator the network including the network entity 200. The processing module 220 may then receive activation code indicator 540 in FIG. 5B from the activation code management server 100.

The received activation code indicator 510, 520, 530, 540, 550, 560 associated with a combination of a network slice identifier 570 and a VNF-product identifier 580 provides, to the network entity, indication of one or more activation codes. These activation codes may serve as codes, keys, flags, identifiers, etc, for use in automatically monitoring, controlling, and enforcing how a VNF is used.

By way of example, a VNFM or other network entity may be required to obtain one or more corresponding activation codes 511-562 from the activation code management server 100 prior to instantiating a VNF in a network slice. If an activation code 511-562 corresponding to the desired VNF and that network slice is not available, the VNFM or other network entity may be configured to automatically prevent deployment of the VNF instance.

By way of example, it may be determined that an activation code 511-562 corresponding to a desired VNF and network slice is not available in cases where an activation code indicator 510, 520, 530, 540, 550, 560 associated with a network slice identifier 570 indicative of that network slice and a VNF-product identifier 580 indicative of that VNF is not available or if such an activation code indicator 510, 520, 530, 540, 550, 560 does not indicate any activation codes).

By way of further example, a VNFM or other network entity may be required to obtain one or more corresponding activation codes 511-562 from the activation code management server 100 prior to enabling one or more additional or alternative functionalities in a VNF instance in a network slice. If an activation code 511-562 corresponding to the desired VNF and that network slice is not available, the VNFM or other network entity may be configured to automatically prevent enablement of the one or more additional functionalities in the VNF instance.

In some example aspects, a network entity may, additionally or alternatively, perform any other suitable action where an appropriate activation code is not available, e.g. outputting an alert or an alarm, notifying the activation code management server 100 and/or notifying any other network entity (such as, for example a NFV MANO, a NFVO, a VNFM, an EM, an OSS/BSS or another VNF instance in the network).

By way of further example, a VNFM, EM or other network entity may be configured to periodically monitor how a VNF is being used (e.g. in terms of the number of instances of the VNF, the volume of traffic or number of users of each VNF instance, a location of each VNF instance, or any other feature or characteristic dictated by the one or more activation codes associated with that VNF and network slice). If the usage of the VNF in not in line with the one or more activation codes, the VNFM, EM or other network node may be configured to temporarily disable or terminate the VNF instance, output an alert or an alarm, notify the activation code management server 100 and/or notify any other network entity.

Additionally, or alternatively, in some example aspects, a VNFM, EM or other network entity may be configured may be configured to monitor one or more VNF instances in a network slice using limit values or range values specified by the one or more activation codes associated with the VNF and network slice. If the usage of any of the VNF instances exceeds a limit value or falls outside a range value, the VNFM, EM or other network node may be configured to, for example, output an alert or an alarm, notify the activation code management server 100 and/or notify any other network entity or take any other suitable action (e.g. reduce the volume of traffic processed by that instance of the VNF, prevent additional users of the network slice from using that instance of the VNF, temporarily disable or terminate one or more instances of the VNF, etc.).

Figure 7:
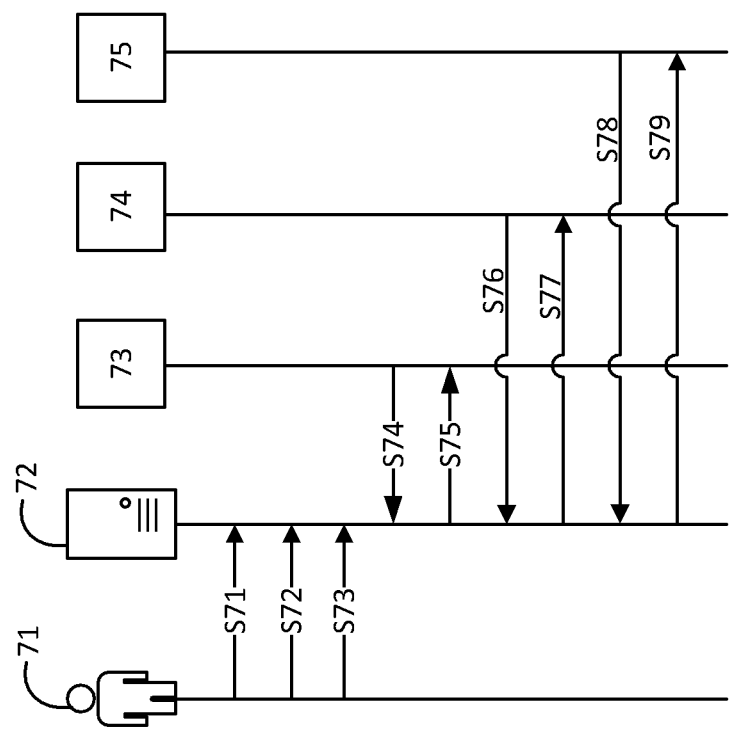
FIG. 7 is a schematic sequence diagram of an exemplary means by which the activation code management server of FIG. 1A may provide activation code indicators to a plurality of network entities, according to an example aspect herein.

FIG. 7 is a schematic sequence diagram of an exemplary means by which the activation code management server 100 of FIG. 1A may provide activation code indicators 510, 520, 530, 540, 550, 560 to a plurality of network entities 72, 73, 74, according to an example aspect herein.

In process step S71 of FIG. 7, a user 81 (e.g. a VNF provider, a network operator, or a network engineer or a network entity) loads a first activation code for use in a first network slice of a first network operator to the activation code management server 100.

In process step S72 of FIG. 7, the user 81 loads a second activation code for use in a second network slice of a second network operator to the activation code management server 100.

In process step S73 of FIG. 7, the user 81 loads a third activation code for use in a third network of a third network operator to the activation code management server 100.

The user 81 may be different for each of process steps S71, S72 and S73.

In process step S74 of FIG. 7, the first network entity 72 transmits, to the activation code management server 100, a request to enable a function of a VNF in the first network slice, the request comprising information indicative of the VNF, the first network slice and the first network operator. The first network entity 72 may be included in the network of the first operator.

By way of example, with reference to FIG. 5B, the request transmitted by the first network entity 72 may include information indicative of a firewall VNF (for which a VNF-product identifier VNFProduct_ID_1 is provided at the activation code management server 100), of the first network slice (for which a network slice identifier NWSlice_ID_1 is provided at the activation code management server 100) and of the first network operator (for whom an operator identifier Operator_ID_1 is provided at the activation code management server 100).

In process step S75 of FIG. 7, the activation code management server 100 transmits, to the first network entity 72, an activation code indicator 510, 520, 530, 540, 550, 560 in accordance with its request. By way of example, the activation code indicator may be activation code indicator 540 which is associated with VNF-product identifier VNFProduct_ID_1, network slice identifier NWSlice_ID_1 and operator identifier Operator_ID_1.

In process step S76 of FIG. 7, the second network entity 73 transmits, to the activation code management server 100, a request to enable a function of a VNF in the second network slice, the request comprising information indicative of the VNF, the second network slice and the second network operator. The second network entity 73 may be included in the network of the second operator.

By way of example, the request transmitted by the second network entity 73 may include information indicative of the firewall VNF, of the second network slice (for which a network slice identifier NWSlice_ID_2 is provided at the activation code management server 100) and of the second network operator (for whom an operator identifier Operator_ID_2 is provided at the activation code management server 100).

In process step S77 of FIG. 7, the activation code management server 100 transmits, to the second network entity 73, an activation code indicator 510, 520, 530, 540, 550, 560 in accordance with its request. By way of example, the activation code indicator may be activation code indicator 550 which is associated with VNF-product identifier VNF-Product_ID_1, network slice identifier NWSlice_ID_2 and operator identifier Operator_ID_2.

In process step S78 of FIG. 7, the third network entity 74 transmits, to the activation code management server 100, a request to enable a function of a VNF, the request comprising information indicative of the VNF and the third network operator. The third network entity 74 may be included in the network of the third operator.

By way of example, the request transmitted by the third network entity 74 may include information indicative of the firewall VNF and of the third network operator (for whom an operator identifier Operator_ID_3 is provided at the activation code management server 100). As a network slice identifier is not provided in the request sent by the third network entity 74, the third network may be regarded as a legacy system.

In process step S79 of FIG. 7, the activation code management server 100 transmits, to the third network entity 72, an activation code indicator 510, 520, 530, 540, 550, 560 in accordance with its request. By way of example, the activation code indicator may be activation code indicator 560 which is associated with VNF-product identifier VNFProduct_ID_1 and operator identifier Operator_ID_3 but is not associated with a network slice identifier.

Figure 8:
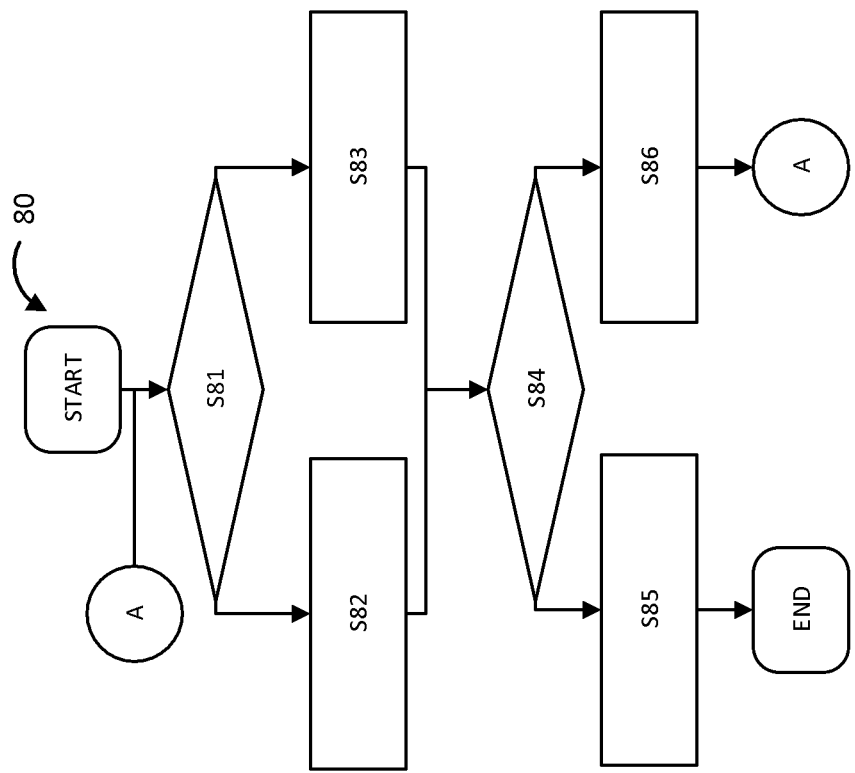
FIG. 8 is a flow diagram illustrating a process by which the activation code management server of FIG. 1A may provide activation code indicators to a plurality of network entities, according to an example aspect herein.

FIG. 8 is a flow diagram illustrating a process 80 by which the activation code management server 100 of FIG. 1A may provide activation code indicators 510, 520, 530, 540, 550, 560 to a plurality of network entities, according to an example aspect herein. By way of example, the activation code management server 100 may perform the process 80 in response to receiving a request in each of process steps S74, S76 and S78 of FIG. 7.

In process step S81 of FIG. 8, the processing module 120 of activation code management server 100 determines whether the request received from a network entity includes information indicative of a network slice. If the processing module 120 determines YES at process step S81, the process 80 proceeds to process step S82. If the processing module 120 determines NO at process step S81, the process 80 proceeds to process step S83.

In process step S82 of FIG. 8, the processing module 120 determines that the network entity is not part of a legacy network and searches for an activation code indicator 510, 520, 530, 540, 550 associated with a particular network slice identifier and a particular VNF-product identifier.

In process step S83 of FIG. 8, the processing module 120 determines that the network entity is part of a legacy network and searches for an activation code indicator 560 associated with a particular VNF-product identifier.

In process step S84 of FIG. 8, the processing module 120 determines whether an activation code indicator 510, 520, 530, 540, 550, 560 that matches with the VNF-product and (optionally) the network slice indicated in the information included in the request. If the processing module 120 determines that such an activation code indicator 510, 520, 530, 540, 550, 560 has been identified, the process 80 proceeds to process step S85. If the processing module 120 determines that no such activation code indicator 510, 520, 530, 540, 550, 560 has been identified, the process 80 proceeds to process step S86.

In process step S85 of FIG. 8, the processing module 120 transmits the identified activation code indicator 510, 520, 530, 540, 550, 560 to the network entity from which the request was received.

In process step S86 of FIG. 8, the processing module 120 transmits a notification or alert to network entity from which the request was received indicating that no activation code indicator 510, 520, 530, 540, 550, 560 is available.

The network entity may take any suitable action in response to this notification or alert. By way of example, the network entity may transmit a further alert to a network operator, network engineer, VNF provider or other user requesting that an activation code be loaded to the activation code management server 100. Additionally, or alternatively, at some point subsequently, the network entity may retransmit the request (indicated as "A" in FIG. 8).

The process 80 of FIG. 8 may be further adapted to process requests including information indicative of an operator.

Figure 9:
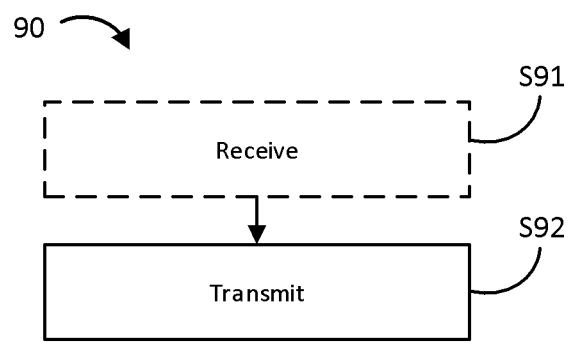
FIG. 9 is a flow diagram illustrating a process by which the activation code management server of FIG. 1A may provide information relating to an activation code indicator to a network entity, according to an example aspect herein.

In addition to receiving activation code indicators 510, 520, 530, 540, 550, 560 from the activation code management server 100, network entities, such as network entity 200 shown in FIG. 1B, may also request information relating to an activation code indicator from the activation code management server 100. FIG. 9 is a flow diagram illustrating a process 90 by which the activation code management server 100 of FIG. 1A may provide information relating to an activation code indicator 510, 520, 530, 540, 550, 560 to a network entity, according to an example aspect herein.

In optional process step S91 of process 90 of FIG. 9, the processing module 120 of the activation code management server 100 may receive, from the network entity, a request comprising information indicative of a VNF among the at least one VNF and a network slice among the plurality of network slices.

The information indicative of a VNF among the at least one VNF and a network slice among the plurality of network slices may take any of the forms discussed above in relation to process step S61A of FIG. 6A. Similarly, the activation code management server 100 may be configured to receive the request for information relating to an activation code indicator 510, 520, 530, 540, 550, 560 by any of the means discussed above in relation to process step S61A of FIG. 6A.

In process step S92 of process 90, the processing module 120 sends information relating to an activation code indicator 510, 520, 530, 540, 550, 560 associated with a corresponding network slice identifier 570 in response to a request from a network entity.

In cases where the processing module 120 receives a request from the network entity, sending the information in response to the request may comprise sending, to the network entity, information relating to an activation code indicator 510, 520, 530, 540, 550, 560 associated with a network slice identifier 570 corresponding to the network slice indicated by the information and to a VNF-product identifier 580 corresponding to the VNF indicated by the information.

Optionally, in cases where the information comprised in the request received from the network entity does not indicate a VNF, the processing module 120 may be further adapted to send, to the network entity, information relating to each activation code indicator 510, 520, 530, 540, 550, 560 associated with a network slice identifier 570 corresponding to the network slice indicated by the information.

In example aspects in which the network entity does not transmit a request for information relating to an activation code indicator 510, 520, 530, 540, 550, 560 to the activation code management server 100, the processing module 120 may be configured to send information relating to an activation code indicator associated with a corresponding network slice identifier periodically or may be triggered to do so by any suitable event (e.g. the network entity transmitting a request to enable a function of a VNF or the network operator or other user loading one or more new activation codes to the activation code management server 100).

The activation code management server 100 may be configured to send the information relating to an activation code indicator 510, 520, 530, 540, 550, 560 by any of the means discussed above in relation to process step S62A of FIG. 6A.

The information relating to an activation code indicator 510, 520, 530, 540, 550, 560 may comprise any suitable information that may useful to the network entity or network service provider. By way of example, the information may include, for example, the number of activation codes 511-562 indicated by an activation code indicator 510, 520, 530, 540, 550, 560; the features, characteristics or functionalities of the VNF to which each activation code refers; the number of times the activation code indicator 510, 520, 530, 540, 550, 560 has been transmitted to a network entity; a log indicating the time and/or date on which indicated activation code was loaded to the activation code management server 100; etc.

Although detailed embodiments have been described, they only serve to provide a better understanding of the invention defined by the independent claims, and are not to be seen as limiting.

[List of Abbreviations]
EM Element Manager
eMBB Enhanced Mobile Broadband
IoT Internet of Things
mMTC Massive Machine Type Communications
NFV Network Function Virtualization
NFVI Network Function Virtualisation Infrastructure
NFV MANO Network Functions Virtualisation Management and Orchestration
NFVO Network Functions Virtualisation Orchestrator
NS Network Service
OSS/BSS Operations Support System/Business Support System
SDN Software Defined Networking
URLLC Ultra Reliable Low Latency Communications
VNF Virtualised Network Function
VNFC Virtualised Network Function Component
VNFM Virtualised Network Function Manager

The invention claimed is:

1. A method of managing, by means of an activation code management server, a plurality of activation codes referring to at least one virtualized network function (VNF) in a network, the network including a plurality of network slices, the method including steps of:
   providing, for each of the plurality of network slices, a network slice identifier in correspondence with a network slice;
   providing at least one VNF-product identifier, each VNF-product identifier being in correspondence with a VNF;

providing a plurality of activation code indicators, each activation code indicator being indicative of one or more of the plurality of activation codes; and associating, at the server, each of the plurality of activation code indicators with a corresponding network slice identifier and a corresponding VNF-product identifier.

2. The method of claim 1, further comprising:

receiving, from a network entity, a request to enable a function of a VNF among the at least one VNF comprising information indicative of the VNF and a network slice among the plurality of network slices; and transmitting, to the network entity, an activation code indicator that is associated with a VNF-product identifier corresponding to the VNF and a network slice identifier corresponding to the network slice.

3. The method of claim 2, wherein:

each activation code enables one or more instances of a VNF to be instantiated in a network slice and/or enables one or more functionalities in an instantiated VNF; and the VNF and the network slice in which the VNF is instantiated is identified by a VNF-product identifier and a network slice identifier, respectively, with which an activation code indicator indicative of the activation code is associated.

4. The method of claim 2, wherein:

each of the plurality of network slices is associated with a respective operator of a plurality of operators; and the method further comprises:

providing, for each of the plurality of operators, an operator identifier in correspondence with the operator; and associating, at the server, each of the activation code indicators with a corresponding operator identifier.

5. The method of claim 4, wherein:

the request to enable a function of the VNF further comprises information indicative of an operator among the plurality of operators;

the activation code indicator transmitted to the network entity is further associated with an operator identifier corresponding to the operator.

6. The method according to claim 1, comprising:

sending, by the server, information relating to an activation code indicator associated with a corresponding network slice identifier in response to a request from a network entity.

7. The method of claim 6, further comprising:

receiving, from the network entity, a request comprising information indicative of a VNF among the at least one VNF and a network slice among the plurality of network slices, wherein sending, by the server, the information in response to the request comprises sending, to the network entity, information relating to an activation code indicator associated with a network slice identifier corresponding to the network slice and a VNF-product identifier corresponding to the VNF.

8. The method of claim 1, wherein:

each activation code enables one or more instances of a VNF to be instantiated in a network slice and/or enables one or more functionalities in an instantiated VNF; and the VNF and the network slice in which the VNF is instantiated is identified by a VNF-product identifier and a network slice identifier, respectively, with which an activation code indicator indicative of the activation code is associated.

9. The method of claim 8, wherein the plurality of activation codes comprises:

at least one activation code configured to enable up to a maximum number of instances of a VNF to be instantiated;

at least one activation code configured to enable one or more instances of a VNF to be instantiated in a predetermined location;

at least one activation code configured to enable one or more instances of a VNF to be instantiated for use by multiple users in a case where the number of users does not exceed a maximum number; and/or at least one activation code configured to enable one or more instances of a VNF to be instantiated during a predetermined period of time.

10. The method of claim 8, wherein:

a VNF among the at least one VNF is configured to enable a function comprising a plurality of functionalities in a network slice when instantiated; and an instance of the VNF, associated with an activation code of the plurality of activation codes, enables a subset of the plurality of functionalities in a network slice in accordance with a corresponding network slice identifier with which the activation code indicator indicative of the activation code and associated with a VNF-product identifier corresponding to the VNF is associated.

11. A non-transitory computer-readable medium comprising, stored thereupon, computer program comprising instructions configured so that, when executed by a computer, the program instructions cause the computer to carry out the method of claim 1.

12. An activation code management server configured to manage a plurality of activation codes referring to at least one virtualized network function (VNF) in a network, the network including a plurality of network slices, the activation code management server comprising:

memory; and processing circuitry, wherein the processing circuitry is configured to:

provide, for each of the plurality of network slices, a network slice identifier in correspondence with a network slice;

provide at least one VNF-product identifiers, each VNF-product identifier being in correspondence with a VNF;

provide a plurality of activation code indicators, each activation code indicator being indicative of one or more of the plurality of activation codes; and associate, at the server, each of the plurality of activation code indicators with a corresponding network slice identifier and a corresponding VNF-product identifier.

13. The activation code management server of claim 12, wherein:

each activation code enables one or more instances of a VNF to be instantiated in a network slice and/or enables one or more functionalities in an instantiated VNF; and the VNF and the network slice in which the VNF is instantiated is identified by a VNF-product identifier and a network slice identifier, respectively, with which an activation code indicator indicative of the activation code is associated.

* * * * *